Patented July 8, 1952

2,602,820

UNITED STATES PATENT OFFICE 2,602,820

MODIFICATION OF THE MOLECULAR STRUCTURE AND CHEMICAL COMPOSITION OF CONJUNCT POLYMERS

Louis Schmerling, Riverside, Ill., assignor to Universal Oil Products Company, Chicago, Ill., a corporation of Delaware No Drawing. Application December 30, 1948, Serial No. 68,374

13 Claims. (Cl. 260—615)

This invention relates to a process for introducing chemical substituents into the molecular structure of polyolefinic, cyclic hydrocarbons or unsaturated conjunct polymers, hereinafter more specifically defined, to alter the physical and chemical properties of said hydrocarbon charging stock, particularly the drying characteristics thereof upon exposure to atmospheric oxygen. More specifically, the invention concerns a means of introducing said chemical substituents in the position of substitutable chlorine atoms introduced by a prior condensation of said conjunct polymers or polyolefinic cyclic hydrocarbons with a halo-olefin.

One of the beneficial results obtainable by the application of the present treatment to the drying oils of either the unsaturated fatty acid ester or the unsaturated synthetic hydrocarbon type is a reduction of the total unsaturation of said oils, particularly of their conjugated unsaturation. The present treatment is believed to introduce such changes in the molecular structure of the drying oil that the tendency of the oil to undergo deep-seated polymerization and oxidation upon exposure of the oil in thin films to atmospheric oxygen is eliminated, the product tending to undergo less extensive oxidation, which terminates at a stage prior to the formation of a brittle dried film. Observation has shown that in those instances in which the unmodified or raw drying oil on exposure in a thin film to atmospheric oxygen forms a hard, brittle layer of dried oil which easily checks and has low abrasion resistance, as in the case of certain unsaturated fatty acid glyceride ester drying oils and particularly the hydrocarbon drying oils containing conjugated unsaturation, modification of the structure and composition of the oil by means of the present process forms a product which, when exposed in a thin film to atmospheric oxygen, forms a harder, tougher, and more durable protective coating than the unmodified drying oil, thereby providing a desirable component in the formulation of paints, varnishes, and other protective coating compositions. In the treatment, therefore, the drying oil loses its original undesirable characteristics associated with its highly unsaturated character, particularly its conjugated unsaturation, and low molecular weight to form a modified drying oil having its film-forming properties and its quality in relation to its use in protective coatings thereby enhanced.

Other objects and advantages obtained by the application of the present process will appear hereinafter in the following further description of the invention.

In accordance with one of its embodiments, the present invention concerns a process for modifying the air-drying properties of a drying oil containing conjugated olefinic unsaturation selected from the group consisting of the unsaturated fatty acid glyceride and the hydrocarbon conjunct polymer drying oils which comprises reacting said drying oil containing said conjugated olefinic unsaturation with a halo-olefin containing not more than about 8 carbon atoms per molecule at such reaction conditions of temperature and pressure that condensation of said halo-olefin and said drying oil is effected.

A more specific embodiment of the invention relates to a process for modifying the volatility, the air-drying and the chemical properties of a synthetic hydrocarbon drying oil comprising a mixture of hydrocarbon conjunct polymers containing polyolefinic, cyclic hydrocarbons having conjugated as well as non-conjugated unsaturation recovered from a catalyst-hydrocarbon sludge formed in a conjunct polymerization reaction which comprises reacting said mixture of conjunct polymers with cis-dichloroethylene at a temperature of from about 100° to about 250° C. and at a pressure sufficient to maintain substantially liquid phase, recovering from the reaction mixture a condensation product of said chloroolefin and said conjunct polymers and thereafter reacting said condensation product with water at a temperature of from about 20° to about 300° C., preferably at from about 150° to 200° C., at a pressure sufficient to maintain substantially liquid phase and in the presence of an alkali metal hydroxide to replace the chloro radicals of the condensation product with hydroxyl groups, and thereafter recovering a mixture of the resulting hydroxyalkyl conjunct polymers from the reaction mixture.

Other embodiments of the present invention relating to specific reactants, reaction conditions, and methods of effecting the present process will be hereinafter referred to in greater detail in the following further description of the invention.

The reaction mechanism believed to be involved in the present process is considered to be a combination of a condensation type reaction in the first stage of the process, and a metathesis type of reaction in which the halogen atom or atoms introduced into the conjunct polymer molecule by the condensation reaction is replaced with one or more radicals selected from the group consisting of hydroxyl, alkoxyl, amino, carboxyl and aryloxyl, radicals by treating the product with water, an alcohol, a non-tertiary amine, a carboxylic acid, a phenol, etc., to form a resulting compound having superior drying oil properties. Not only are chemical groups introduced in both the primary and secondary stages of the process which markedly affect the drying properties of the conjunct polymer hydrocarbons, but the molecular weight of the modified drying oil is increased as a result of the present treatment. Perhaps the most significant change as related to the drying properties of the oil, is that the modified oil has a lower maleic anhydride value indicating that the large number of conjugated olefinic bonds present in the molecular structure of the original drying oil charging stock and considered to be responsible for the formation of brittle films upon drying has been reduced during the treatment. The observed physical effects of the conversion is a reduced drying rate of the modified oil and a displacement of the tendency of the oil to become frosted or cloudy on drying, as in the case of such rapid drying oils as tung, oiticica and dehydrated castor oil. Furthermore, the modified oils do not show the same tendency to yellow and undergo pronounced coloring effects when aged following the drying thereof, as shown by the unmodified oil, noted especially in the case of the unsaturated fatty acid ester drying oils, such as isomerized linseed oil and tung oil. Hydrocarbon drying oils, such as those recovered from catalyst-hydrocarbon sludges formed in conjunct polymerization reactions and containing hydrocarbons having a cyclic, polyolefinic structure in which a large percentage of the olefinic double bonds are conjugated, as hereinafter more specifically characterized, are also improved by application of the present treatment thereto. The physical improvement in the latter type of drying oil or a co-bodied mixture of the same with the fatty acid glyceride drying oil is indicated by the pronounced reduction in the embrittlement factor inherent in the unmodified drying oils when air dried. In contrast, the modified drying oil under the same drying conditions forms a dried film which is tougher, more resistant to abrasion and possesses significantly greater weather resistance than the brittle films formed upon drying the raw or unmodified drying oil.

The enhanced weather and wear resistance of the present product is an especially valuable improvement when the product is utilized as a drying oil component in the formation of paint and varnish compositions where toughness and abrasion resistance of the dried film are especially important characteristics in nearly all of its applications as such. Furthermore, the chemically diverse radicals introducible into the conjunct polymers by means of the secondary metathesis reaction of the presence process may be subsequently condensed or otherwise reacted with other compounds to increase the molecular weight and modify the physical and chemical properties of the product further. For example, the hydroxylated conjunct polymer resulting from the reaction of the secondary stage of the process may be esterified with an alkanoic or alkenoic acid to form an unsaturated, high molecular weight ester, particularly desirable as a drying oil.

The starting material subjected to modification by means of the present process and herein specified as a drying oil includes generally the polyunsaturated fatty acids and their esters, as well as certain types of unsaturated, relatively high molecular weight hydrocarbons, referred to as unsaturated conjunct polymers, at least part of the unsaturation of both the hydrocarbon and ester drying oils being of the conjugated variety. The fatty acid ester type of drying oil occurs naturally as the fatty acid glycerides, although the glyceride radical may be replaced for the purposes of the present process by substituting other alcohol ester linkages such as the alkoxy portion of such alkanols as ethanol, the poly-hydroxy glycols, such as ethylene glycol, pentaerythritol, sorbitol, and the like, and the alkanol amines represented, for example, by the mono- and poly-ethanol amines. Included among the fatty acid oils utilizable in the present process are the drying oils containing conjugated olefinic double bonds. Of these, tung oil, linseed oil, dehydrated castor oil, oiticica oil, perilla oil, olive oil, cottonseed oil, cocoanut oil, etc. are representative oils of the glyceride ester type utilizable herein.

The drying oils herein specified as the conjunct polymer hydrocarbon type comprise hydrocarbons of unsaturated structure, generally of relatively high molecular weight, above about 150, and usually of cyclic structure containing conjugated as well as non-conjugated unsaturation. One of the preferred sources of the hydrocarbon type of drying oil which is especially suitable as the primary reactant in the present progress are the catalyst-hydrocarbon sludges recovered from certain hydrocarbon conversion processes utilizing catalysts capable of causing conjunct polymerization between the hydrocarbon reactants charged to the conversion process. Typical of the catalysts capable of causing conjunct polymerization reactions are the various Friedel-Crafts metal halide catalysts, such as aluminum chloride, aluminum bromide and certain members of the acid type catalysts, such as concentrated sulfuric acid, substantially anhydrous hydrogen fluoride and boron trifluoride as well as others generally known to the art. The above conjunct polymerization catalysts, when contacted with a reactive, generally non-aromatic hydrocarbon, such as a mono- or poly-olefin containing at least 3 carbon atoms per molecule or a branched chain paraffin at reaction conditions favorable to the formation of conjunct polymers, produce a catalyst-hydrocarbon containing sludge as a distinct reaction product of the process. Conjunct polymerization occurs in the mixture of catalyst and hydrocarbons by virtue of simultaneous polymerization, cyclization, and hydrogen transfer reactions between the hydrocarbons to form relatively saturated hydrocarbon material or saturated conjunct polymers as one reaction product, and an accompanying product comprising high molecular weight unsaturated cyclic compounds, generally referred to in the art as unsaturated conjunct polymers, containing from about 2 to about 4 double bonds per molecule in conjugated as well as non-conjugated relationship to each other. The unsaturated conjunct polymer product becomes combined with the catalyst in definite molecular proportions to form a sludge-like material comprising addition complexes of said unsaturated conjunct polymers and said catalyst. The conjunct polymers are recoverable from the catalyst component of the sludge by special methods of decomposing the catalyst-hydrocarbon complexes contained in the sludge. One method of decomposition comprises heating the sludge until either the catalyst or conjunct polymers are vaporized therefrom, hydrolizing the complexes contained in the sludge, as for example, by adding the sludge to water or a dilute caustic, or they may be recovered by extraction or displacement with a solvent or a more reactant material. It is not the purpose nor is it essential here to describe in detail the methods of producing sludge or recovering the hydrocarbon type of drying oil therefrom; but a description of the process relative to the use of substantially anhydrous hydrogen fluoride as conjunct polymerization catalyst (which forms a conjunct polymer hydrocarbon product having a maximum in conjugated unsaturation as compared to other conjunct polymerization catalysts and a product which, apparently, possesses many of the most desirable characteristics of a hydrocarbon type drying oil) will be briefly referred to in examples hereinafter appended.

The drying oil starting material may also comprise a co-bodied mixture of an unsaturated fatty acid ester and an unsaturated hydrocarbon drying oil preferably co-bodied prior to the present treatment. The co-bodying reaction may be effected by intimately mixing the drying oils and heating the mixture to a temperature of from about 250° to about 350° C. for a period of time generally of from about 1 to about 6 hours, or until the viscosity of the mixture approaches the desired value. The cobodying reaction should, however, be interrupted prior to the stage at which the unsaturation is entirely eliminated, since the operability of the present process and the ultimate drying characteristics of the product are dependent upon the retention of at least a portion of the unsaturated bonds present in the original charging stock. Co-bodying may also be effected in the presence of certain catalytic agents, such as acid-acting substances, typical of which are the mineral acids, preferably phosphoric acid, a silica-alumina composite which is normally acidic, or a solid phosphoric acid catalyst formed by calcining a siliceous absorbent such as kieselguhr impregnated with a suitable phosphoric acid. The drying oils, either individually, or a co-bodied mixture thereof, may be steam- or air-blown prior to utilization in the present process to provide a drying oil containing a higher degree of unsaturation and particularly of conjugated unsaturation.

In the primary stage of the process wherein the drying oil charging stock and a halo-substituted olefin are condensed, the reactant specified herein as a halo-olefin preferably contains a maximum of about 8 carbon atoms per molecule, although higher molecular weight halo-olefins may also be utilized when suitable reaction conditions are selected to obtain the desired condensation between the reactants. Halogen substituted alkenyl aromatic compounds, in which the halogen appears in the alkenyl side chain or as a nuclear substituent, such a beta-bromostyrene or para-chlorostyrene, are likewise utilizable in the condensation reaction of the primary stage of the present process. The halo-olefin reactant may contain one or more than one halogen substituents and these may be all alike or dissimilar in the same compound. The halo-olefins utilizable herein are selected from the chloro-, bromo- and iodo-substituted olefins, that is, from the olefins containing halogen substituents of atomic weight greater than 35, the chloro-substituted olefins being preferred because of their reactivity herein and the generally lower cost of preparing such compounds. Typical representative halo-olefins utilizable in the condensation reaction include such compounds as cis-dichloroethylene, allyl chloride, vinyl chloride, 2-bromo-1-pentene, 2-chloro-1, 3-butadiene etc., of the alkenyl series, and such compounds as 3- chlorocyclopentene, 4-chlorocyclohexene, etc., of the cycloalkene series. The preferred halo-olefins are the halo-substituted ethylenes, propenes, and butenes. The halo-olefins of lowest molecular weight are additionally preferred on the basis that the condensation proceeds readily at relatively low reaction temperatures, compared to the halo-olefins of higher molecular weight which, in general, require more severe reaction conditions, such as a higher temperature or a longer reaction period to obtain quantitative or nearly quantitative conversion to the condensation product. Concomitant with the use of high temperatures and/or longer reaction periods, the product may undergo a certain degree of discoloration and for this additional reason, said lower molecular weight halo-olefins generally are preferred.

The condensation of an unsaturated drying oil charging stock containing conjugated unsaturation with a halo-olefin to form the intermediate product of the present process, is generally effected at temperatures of from about 100° to about 300° C., preferably at temperatures of from about 150° to about 250° C., and at pressures sufficient to maintain substantially liquid phase in the reaction mixture. It is generally preferred to maintain a molar excess of the halo-olefin in the reaction mixture of from about 1.5 to 1 to about 10 to 1 moles of halo-olefin per mole of drying oil and adjust the pressure in the system to obtain reflux of the halo-olefin at the selected reaction temperature. For example, when utilizing a low molecular weight halo-olefin reactant, such as a halogen-substituted ethylene compound, the pressure is desirably superatmospheric to maintain temperatures of from about 100° to about 300° C. in the reaction mixture, whereas, in utilizing a relatively high molecular weight halo-olefin such as chlorooctene, the pressure may be atmospheric, or even subatmospheric if it is desired to obtain reflux within the selected range of reaction temperatures. Following completion of the resulting condensation reaction, the reaction mixture is separated, for example, by distillation and/or extraction of the excess halo-olefin therefrom, leaving a residue comprising predominantly the desired condensation products.

The metathesis reaction involved in the secondary stage of the present process whereby the condensation products of the halo-substituted olefin and the drying oil reactant is reacted with a compound containing a replaceable hydrogen atom and a radical selected from the group consisting of hydroxy, alkoxy, amino, and aryloxy radicals is effected by contacting the respective condensation product and the replaceable hydrogen containing compound at a temperature of from about 20° to about 300° C., preferably from about 150° to about 200° C. and at a pressure sufficient to maintain substantially liquid phase in the reaction mixture. Since hydrogen halide is eliminated during the metathesis reaction, it is generally advantageous to provide a scavenger for the hydrogen halide gas in the reaction mixture. Suitable compounds which will react with the hydrogen halide to remove the same from the reaction mixture as the metathesis reaction proceeds, include, in general, certain alkaline-acting materials such as the alkali metal or alkaline earth metal hydroxides, carbonates, oxides and salts of weak acids, including such typical compounds as sodium hydroxide, calcium hydroxide, calcium carbonate, potassium carbonate, di- or tri-basic sodium orthophosphate, the amines etc. The amount of the alkaline-acting scavenger compound introduced into the reaction mixture is preferably sufficient to completely react with all of the hydrogen halide liberated from the metathesis reaction.

The compounds capable of reacting with the one or more halogen atoms introduced into the condensation reaction product of the primary stage of the process, as heretofore characterized, contain an active hydrogen atom capable of combining with the halogen atom of the condensation product to form the corresponding hydrogen halide which is liberated from the reaction mixture. When it becomes desirable to substitute an hydroxyl group for the halogen atom of the condensation product, the compound utilized in the metathesis reaction is water, preferably in the presence of a soluble alkali metal hydroxide, such as sodium or potassium hydroxide. In order to introduce an alkoxy or aryloxy group into the condensation product, the corresponding alcohol and phenol respectively, are utilized in the reaction. The amino and alkylamino substituted condensation product may be obtained by reacting the halogen substituted primary condensation product with ammonia, or a mono- or dialkyl amine to form the corresponding amino or alkyl substituted amino derivative of the primary condensation product in which the amino radical replaces the one or more halogen substituents thereof. Typical compounds utilizable in the actual metathesis reaction include such alcohols as the aliphatic and naphthenic alcohols, as for example, ethyl alcohol, vinyl alcohol, propyl alcohol, allyl alcohol, primary, secondary and tertiary butyl alcohol, etc., of the aliphatic series and cyclohexanol, methylcyclohexanol, etc., of the naphthenic alcohol series, which, when reacted with the halogen-containing condensation product form the corresponding alkoxy derivatives. Phenolic compounds capable of reacting with the halo-substituted condensation product to form the corresponding aryloxy compounds, include phenol itself, its alkyl-substituted derivatives such as cresol, the various xylenols, such as 2,3-xylenol, thymol, etc.

An amine hydrochloride group which may subsequently be hydrolyzed by treating the product with an aqueous base may be formed by reacting the halogen-substituted condensation product with ammonia or ammonium chloride, usually at a relatively high pressure and by bubbling the anhydrous ammonia gas through the primary condensation product in liquid phase at a reaction temperature of from about 100° to about 300° C. The alkyl amine derivatives of the primary condensation product in which the amino radical replaces the halogen substituent of the condensation product are formed by reacting the primary condensation product with an alkyl amine, such as the mono- and dimethyl amines, and their homologs. The amine reactant may be an alkanol amine which reacts with the halogen-substituted condensation product of the primary reaction to form mixed alkanol amine and amino alkoxy derivatives.

The carboxyl substituted condensation product in which said group replaces the halogen substituent of the primary condensation reaction product may be formed by reacting said primary condensation product with a carboxylic acid or its salts, such as the alkali metal and alkaline earth metal salts thereof. The carboxylic acids may be selected from either the alkanoic acid series such as formic acid, acetic acid, propionic acid, and their homologs, the alkenoic acid series such as acrylic acid, crotonic acid and their homologs, or the aromatic acid series, such as benzoic acid, toluic acid, and higher homologs thereof as well as the alkali metal and alkaline earth metal salts thereof.

In the above specified broad range of reaction conditions for effecting the metathesis reaction, wherein the various derivatives hereinabove mentioned of the primary condensation product are formed, said compounds are not necessarily formed at analagous or equivalent reaction conditions. For example, the reaction conditions required for the formation of an hydroxylated derivative of the primary condensation product in which the hydroxyl group replaces the halogen radical thereof, the reaction is usually carried out at a temperature of from about 100° C. to about 150° C. whereas the reaction temperature required for the formation of a carboxyl derivative of the primary condensation reaction product (as for example, the metathesis reaction product formed by reacting the primary product with a high molecular weight alkenoic acid, such as oleic acid) is generally of from about 200° to about 250° C.

Following the completion of the secondary or metathesis reaction of the present process, whereby a secondary substituent which in itself is often reactive, is introduced into the primary charging stock, the metathesis product resulting thereby may in some instances be further reacted with a suitable compound to form other derivatives thereof. An ester, for example, may be formed by reacting the carboxylated compound with an alcohol or the hydroxylated compound with a carboxylic acid. Another example, is the formation of a carboxamide by reacting the aminated product with a carboxylic acid followed by dehydration of the resulting amine salt of the carboxylic acid, etc. The ultimate product usually possesses modified properties which enhance the original drying characteristics of the polyolefinic, cyclic hydrocarbon starting material, or modify its drying properties to form a superior product for drying oil purposes. The products, which necessarily are of higher molecular weight and retain at least some of the original unsaturation of the polyolefinic, cyclic hydrocarbon conjunct polymers, dry upon exposure to atmospheric oxygen to a tough, non-tacky film.

The invention is clearly illustrated in the following examples which indicate the present two-stage process in reference to a particular charging stock, catalyst, and reaction conditions; it is not intended by the recitation of the above factors in the following examples to limit their generally broad scope to the specific limits therein set forth.

*Example I*

A mixture of polyolefinic, cyclic hydrocarbons or conjunct polymers in which the olefinic unsaturation is both conjugated and unconjugated is prepared by means of the following conversion: An octene fraction of a co-polymer gasoline (the product of the mixed polymerization of propylene and butylene monomers) is reacted with hydrogen fluoride to form a sludge phase and a relatively saturated upper hydrocarbon phase. In this reaction, 22 liters (16.5 kg.) of the gasoline (having a bromine number of 162 and containing mono-olefinic hydrocarbons varying in molecular weight from octene to dodecylene) is charged into a pressure autoclave and rapidly stirred as 9.0 kg. of liquid anhydrous hydrogen fluoride is introduced into the reactor. The pressure is maintained at approximately 205 lbs./sq. in. and the temperature at about 91° C., as stirring is continued for a reaction period of approximately one hour. The upper saturated hydrocarbon phase is decanted from the lower acidic sludge layer and the latter sludge treated in accordance with the following method of decomposing the hydrogen fluoride sludge complexes contained therein.

5000 grams of the above sludge is allowed to flow into a mixture of ice and water, additional ice being added as the heat of the resulting hydrolyzing reaction melts the ice. 2170 grams of a light-colored, sweet-smelling oil separates from the aqueous phase, which has the following physical and chemical properties:

Boiling range _____ 160° to about 400° C.
Density, $D_4^{20}$ _____ 0.863
Molecular weight, average ___ 304
Diene number _____ 85
Bromine number _____ 195
Double bonds per
   molecule, average _____ 3.2

The above mixture of polyolefinic, cyclic hydrocarbons containing conjugated unsaturation when spread as a thin film and exposed to atmospheric oxygen dries to form a brittle, flaky film after 72 hours of such exposure.

A fraction boiling from about 220° C. to about 325° C. is separated from the polyolefinic, cylic hydrocarbon mixture recovered from the sludge by the above hydrolytic procedure as one of the reactants in the following condensation reaction with a halo-olefin.

300 parts by weight of the 220–325° C. fraction of the above prepared conjunct polymer hydrocarbons (approximately 0.77 mol, based upon the average molecular weight as being about 390) and 300 parts by weight of trans-dichloroethylene (approximately 3.1 mols,) are charged into a rotating autoclave containing nitrogen at 50 atmospheres pressure and heated at 220° C. for two hours. The mixture is cooled and the excess trans-dichloroethylene distilled therefrom. The residue is an oil which distills at temperatures above the boiling point of the initial hydrocarbon charging stock (325° C.) and contains organically bound chlorine by analysis. Upon exposing the material as a thing film to atmospheric oxygen, it sets to a tough film which does not become brittle after prolonged exposure to air.

*Example II*

500 parts by weight (approximately 1.3 molar proportions) of the 220–325° C. fraction of the polyolefinic, cyclic hydrocarbon mixture prepared as in Example I and 390 parts by weight (approximately 3.9 molar proportions) of allyl chloride are charged into a rotating autoclave containing nitrogen at 50 atmospheres pressure and heated at 192° C. for two hours. The mixture is thereafter cooled and extracted with liquid pentane and the extract phase distilled to remove pentane and the excess allyl chloride reactant. The residue comprising the product of the reaction is an amber-colored oil which distills at a temperature above the boiling point of the hydrocarbon charging stock (325° C.) and contains organically bound chlorine, by analysis.

*Example III*

The condensation product of Example I containing organically bound chlorine and comprising the reaction product of the polyolefinic, cyclic hydrocarbons and transdichloroethylene is admixed with a 10% aqueous solution of sodium hydroxide containing approximately 3 mols of the base and heated in a rotating pressure autoclave containing nitrogen at 50 atmospheres pressure to a temperature of about 220° C. for 90 minutes, the reaction mixture being stirred by rotation of the autoclave during the heating operation. When cooled, the reaction mixture is neutralized with dilute sulfuric acid and the oil extracted from the aqueous phase by pentane. Evaporation of the pentane from the extract phase leaves a residue comprising an amber-colored oil containing oxygen by analysis and which can be esterified by reaction with acetyl chloride to yield the corresponding acetate ester.

*Example IV*

The organically bound chlorine-containing condensation product of Example II is converted to an ether by reaction thereof with a primary alcohol. 100 parts by weight of the condensation product is heated with 40 parts by weight of absolute methanol at 200° C. and at a pressure of 70 atmospheres to yield the methyl ether derivative of the condensation product. The ether is an oil having improved drying properties as compared with the initial polyolefinic cyclic hydrocarbon charging stock in that it does not form a brittle, flaky film on exposure to atmospheric oxygen.

I claim as my invention:

1. The process which comprises reacting a drying oil containing polyolefinic cyclic hydrocarbons recovered from the sludge formed in a conjunct polymerization reaction with a halo-olefin of which the halogen has an atomic weight greater than 35 to form a halogen-containing condensation product and thereafter replacing the halogen of the resulting product with a radical selected from the group consisting of the hydroxyl, alkoxyl, amino, carboxyl and aryloxyl radicals to yield a modified drying oil product.

2. The process of claim 1 further characterized in that said halo-olefin is a mono-halo-olefin containing from 2 to 8 carbon atoms per molecule.

3. The process of claim 1 further characterized in that said halo-olefin is a chloro-olefin.

4. The process which comprises reacting a drying oil containing conjugated olefinic unsaturation selected from the group consisting of a fatty acid ester and the polyolefinic, cyclic hydrocarbons recovered from the sludge formed in a conjunct polymerization reaction with a halo-olefin of which the halogen has an atomic weight greater than 35 to form a halogen-containing condensation product and thereafter reacting the resulting product with water to effect the liberation of hydrogen halide from the reaction mixture and to yield a modified drying oil product.

5. The process which comprises reacting a drying oil containing conjugated olefinic unsaturation selected from the group consisting of the unsaturated fatty acid esters and the polyolefinic, cyclic hydrocarbons recovered from a sludge formed in a conjunct polymerization reaction with a halo-olefin of which the halogen has an atomic weight greater than 35 to form a halogen-containing condensation product and thereafter reacting the resulting product with an alcohol to liberate hydrogen halide from the reaction mixture and form a modified drying oil product.

6. The process of claim 1 further characterized in that the replacement of the halogen of said condensation product is effected in the presence of an alkaline-acting material reactive.

7. The process which comprises reacting a drying oil containing polyolefinic, cyclic hydrocarbons recovered from a sludge formed in a conjunct polymerization with a halo-olefin at a temperature of from about 100° to about 300° C. and in substantially liquid phase to form a halogen-containing condensation product and thereafter reacting the resulting product with a compound selected from the group consisting of water, an alcohol, a non-tertiary amine, a carboxylic acid and a phenol to yield a modified drying oil product.

8. The process which comprises reacting a drying oil containing polyolefinic, cyclic hydrocarbons recovered from a sludge formed in a conjunct polymerization reaction with a halo-olefin of which the halogen substituent thereof has an atomic weight greater than 35 to form a halogen-containing condensation product, and thereafter reacting the resulting product at a temperature of from about 50° to about 250° C. and in substantially liquid phase with a compound selected from the group consisting of water, and alcohol, a non-tertiary amine, a carboxylic acid and a phenol to yield a modified drying oil product.

9. The process which comprises reacting a mixture of polyolefinic, cyclic hydrocarbons recovered from the sludge formed in a conjunct polymerization reaction with trans-dichloroethylene at a temperature of about 220° C. and in substantially liquid phase and thereafter reacting the resulting chlorine-containing condensation product with a dilute aqueous, solution of sodium hydroxide at a temperature of about 220° C.

10. The process which comprises reacting a mixture of polyolefinic, cyclic hydrocarbons recovered from a sludge formed in a conjunct polymerization reaction with trans-dichloroethylene at a temperature of about 220° C. and in substantially liquid phase and thereafter reacting the resulting chlorine-containing condensation product with methanol at about 200° C.

11. The drying oil product formed by the process of claim 1.

12. The drying oil product formed by the process of claim 9.

13. The drying oil product formed by the process of claim 10.

LOUIS SCHMERLING.

REFERENCES CITED

The following references are of record in the file of this patent:

UNITED STATES PATENTS

| Number | Name | Date |
|---|---|---|
| 1,975,959 | Lawson et al. | Oct. 9, 1934 |
| 2,194,350 | Berg | Mar. 19, 1940 |
| 2,442,085 | Huff et al. | May 25, 1948 |
| 2,466,340 | Van Atta et al. | Apr. 5, 1949 |
| 2,468,748 | Griess et al. | May 3, 1949 |
| 2,470,894 | Johnstone | May 24, 1949 |

OTHER REFERENCES

Gardner et al.: Jour. Ind. Eng. Chem., pages 619–621 (July 1922).

Whitmore: "Organic Chemistry," page 75, D. Van Nostrand Co., Inc., N. Y. (January 1942).